United States Patent [19]

Kade

[11] Patent Number: 4,527,103

[45] Date of Patent: Jul. 2, 1985

[54] FOUR STATE DC MOTOR CONTROLLER

[75] Inventor: Alexander Kade, Detroit, Mich.

[73] Assignee: General Motors Corporation, Detroit, Mich.

[21] Appl. No.: 618,814

[22] Filed: Jun. 8, 1984

[51] Int. Cl.³ .............................................. H02P 1/22
[52] U.S. Cl. ..................................... 318/293; 307/270
[58] Field of Search ............... 318/257, 258, 293, 563; 307/254, 255, 262, 270

[56] References Cited

U.S. PATENT DOCUMENTS

| | | | |
|---|---|---|---|
| 3,371,259 | 2/1968 | James et al. | 318/380 |
| 3,427,520 | 2/1969 | Oppedahl | 318/599 |
| 3,611,092 | 10/1971 | Wilmunder | 318/258 |
| 4,146,801 | 3/1979 | Vali et al. | 318/563 X |
| 4,267,492 | 5/1981 | Manners | 318/258 X |
| 4,275,340 | 6/1981 | Schleupen | 318/280 |
| 4,319,170 | 3/1982 | Brent | 318/258 X |
| 4,447,768 | 5/1984 | Terui | 354/409 X |

FOREIGN PATENT DOCUMENTS

| | | | |
|---|---|---|---|
| 56-49691 | 5/1981 | Japan | 318/317 |
| 57-206283 | 12/1982 | Japan | 318/293 |

Primary Examiner—William M. Shoop
Assistant Examiner—Bentsu Ro
Attorney, Agent, or Firm—Mark A. Navarre

[57] ABSTRACT

A driver circuit for a transistor bridge is selectively controllable to produce four state operation of a DC motor. The driver circuit has two control inputs yielding four distinct input combinations, each combination producing a different state of motor operation. The states which may be selectively produced are (1) motor off or coasting, (2) motor on, counterclockwise rotation, (3) motor on, counterclockwise rotation and (4) motor off, dynamic braking.

1 Claim, 4 Drawing Figures

FOUR STATE DC MOTOR CONTROLLER

This invention relates to the control of a DC permanent magnet motor and more particularly to a controller which affords four state motor operation.

Many motor control applications require four state motor operation. That is, the controller must be able to selectively turn on the motor in either direction, dynamically brake the motor, and turn off the motor. With a conventional permanent magnet DC motor, rotation is produced by supplying direct or pulsed current to the motor armature winding, and the direction of motor current determines the direction of rotation. The motor is turned off to permit coasting by open-circuiting the winding and is dynamically braked by short-circuiting the winding. Conventionally, four state operation capability is attained with separate control inputs for each of the desired motor states, resulting in three or more control wires in addition to the power connections.

This invention is directed to a controller having four state motor control capability where only two control wires are required. This advantage over the prior art is achieved with a conventional transistor bridge and a novel drive circuit therefore. The motor armature winding is connected across one pair of opposing bridge terminals and a source of direct current is connected across another pair of opposing bridge terminals. First and second pairs of transistors are connected in diagonally opposed legs of the bridge such that the motor is energized with current from the source in one direction to produce forward motor rotation when both transistors of the first pair are conductive, and in the opposite direction to produce reverse motor rotation when both transistors of the second pair are conductive. The drive circuit comprises first and second driver means for the first and second transistor pairs, each such driver means being operated by a single control wire. Each driver means comprises an additional pair of transistors and is effective when enabled to bias both transistors of the respective first and second pair of bridge transistors conductive and additionally for maintaining one transistor of the other bridge transistor pair nonconductive. When both the first and second driver means are disabled, all of the bridge transistors are rendered nonconductive effectively disconnecting the motor from the source and open-circuiting the motor windings. When the driver means are oppositely enabled and disabled, both transistors of the first or second pair of bridge transistors are rendered conductive to effect forward or reverse motor rotation. When the driver means are concurrently enabled, one transistor of each of the first and second pair of bridge transistors are rendered conductive to short circuit the motor winding for effecting dynamic braking. Four distinct driver circuit input combinations are possible and each such combination produces a different state of motor operation. In addition, the bridge circuit inherently protects against short-circuiting of the power supply through either pair of serially connected bridge transistors.

IN THE DRAWINGS

Figure 1:
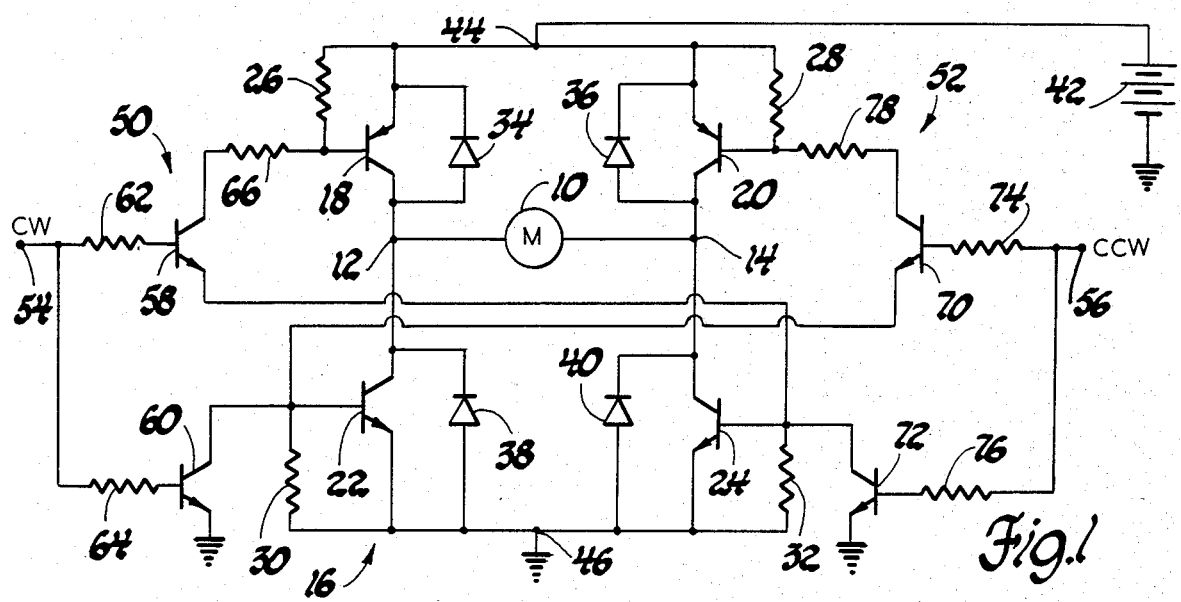
FIG. 1 is a circuit diagram of a bridge and driver circuit according to a first embodiment of this invention.

Referring now more particularly to FIG. 1, reference numeral 10 generally designates a DC motor of conventional permanent magnet or series field construction. The terminals 12 and 14 are internally connected to the motor armature winding in the usual manner through a brush and commutator assembly, not shown. The reference numeral 16, generally designates a conventional transistor bridge circuit comprising the PNP power transistors 18 and 20 and the NPN power transistors 22 and 24. Normally, the transistors 18 and 20 are maintained nonconductive by the pull-up resistors 26 and 28, respectively, and the transistors 22 and 24 are maintained nonconductive by the pull-down resistors 30 and 32. A freewheeling diode 34, 36, 38 or 40 is connected across the emitter-collector junction of each of the power transistors 18, 20, 22 and 24 for the purpose of protecting the respective transistor at the turn-off thereof from damage due to inductive energy stored in motor 10. The motor 10 is connected at its terminals 12 and 14 across one side of the bridge 16, and a source of direct current, such as battery 42 is connected across the other side of the bridge 16 at the terminals 44 and 46.

The operation of bridge 16 is as follows. The motor 10 is de-energized or turned off by biasing all of the transistors 18, 20, 22 and 24 to their nonconductive states. The motor 10 is supplied with current in a direction from its terminal 12 to its terminal 14 to produce clockwise motor rotation when the diagonally opposed power transistors 18 and 24 are biased to their conductive states. The motor is supplied with current in a direction from its terminal 14 to its terminal 12 to produce counterclockwise motor rotation when both the power transistors 20 and 22 are biased to their conductive states. In addition, the motor 10 may be dynamically braked by short-circuiting the armature winding thereof through a bridge transistor and a freewheeling diode. For example, clockwise motor rotation may be dynamically braked by biasing the bridge transistor 18 conductive to establish a short circuit current path through its emitter-collector junction and the freewheeling diode 36. Alternatively, dynamic braking of clockwise motor rotation may be achieved by biasing the bridge transistor 24 conductive to establish a short circuit path through its emitter-collector junction and the freewheeling diode 38. Counterclockwise motor rotation may be dynamically braked by biasing either of the bridge transistors 20 or 22 conductive.

Two separate but identical drive circuits, designated generally by the reference numerals 50 and 52, are provided for controlling the conduction of the bridge power transistors 18, 20, 22 and 24. The operation of the driver circuit 50 is determined by the voltage applied to its input terminal 54 and the operation of the driver circuit 52 is determined by the voltage applied to its input terminal 56. The input terminal 54 is designated as CW since it controls clockwise (CW) motor rotation, and the input terminal 56 is designated as CCW since it controls counterclockwise (CCW) motor rotation.

The bridge driver circuit 50 comprises a first transistor 58 for biasing the bridge transistors 18 and 24 into conduction and a second transistor 60 for biasing the bridge transistor 22 nonconductive. The input terminal 54 is applied to the base of transistor 58 through the input resistor 62 and to the base of transistor 60 through the input resistor 64. The resistor 66 limits the amount of bias current supplied by transistor 58 to the bridge transistors 18 and 24.

The bridge driver circuit 52 comprises a first transistor 70 for biasing the bridge transistors 20 and 22 conductive, and a second transistor 72 for biasing the bridge transistor 24 nonconductive. The input terminal 56 of driver circuit 52 is applied to the base terminal of the transistor 70 through the input resistor 74 and to the base input of transistor 72 through the input resistor 76. The resistor 78 limits the amount of bias current supplied by the driver transistor 70 to the bridge transistors 20 and 22.

Figure 3:
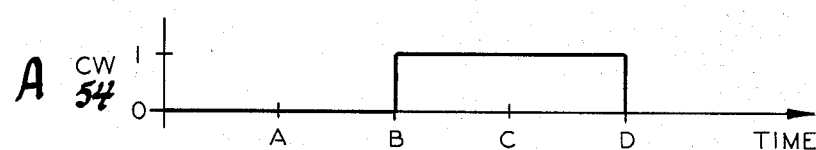
FIG. 3 is a time-based logic diagram showing the four different input combinations possible with the driver circuit of this invention.
Figure 4:
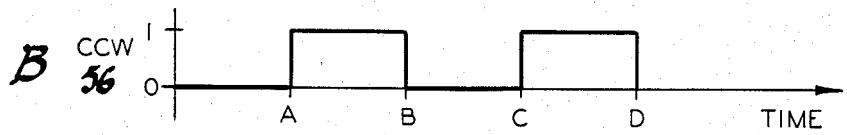
FIG. 4 is a logic truth-table depicting the motor function attained for each of the four different driver circuit input combinations.

The operation of the bridge driver circuits 50 and 52 and the motor functions thereby produced, are illustrated in FIGS. 3 and 4. Referring to the logic diagrams of FIG. 3, the horizontal or time axis is divided into four intervals by the letter designations A, B, C and D. FIG. 3A shows the logic level applied to the CW input terminal 54 and FIG. 3B shows the logic level applied to the CCW input terminal 56. Thus, for the time interval between zero and A, logic zero voltage potential is applied to both input terminals 54 and 56. As indicated in the truth table of FIG. 4, a first motor state results wherein the armature winding of motor 10 is deenergized (OFF) and the rotor is permitted to coast. In such state, all of the bridge and bridge driver transistors are biased nonconductive and the windings of motor 10 are essentially open-circuited.

In the time interval defined by the letters A and B, in FIG. 3, a logic zero voltage potential is applied to input terminal 54 and a logic 1 voltage potential is applied to input terminal 56. As indicated in the truth table of FIG. 4, a second state results wherein the armature winding of motor 10 is energized (ON) in a direction to produce counterclockwise motor rotation. In this state, the driver transistors 58 and 60 are biased nonconductive and the driver transistors 70 and 72 are biased conductive. The driver transistor 70 thereby biases the bridge transistors 20 and 22 into conduction through resistor 78, and current is supplied to the motor 10 from battery 42 in a direction from the motor terminal 14 to the motor terminal 12. When the motor winding is so energized, counterclockwise motor rotation results. The driver transistor 72 under such conditions maintains the bridge transistor 24 non-conductive.

In the time interval defined by the letters B and C in FIG. 3, a logic 1 voltage potential is applied to the input terminal 54 and a logic zero voltage potential is applied to the input terminal 56. As indicated by the truth table of FIG. 4, a third state of motor operation results wherein the armature winding of motor 10 is energized (ON) to produce clockwise motor rotation. Specifically, the logic zero voltage potential at terminal 56 biases the driver transistors 70 and 72 nonconductive, and the logic 1 voltage potential at terminal 54 biases the driver transistors 58 and 60 and the bridge transistors 18 and 24 conductive. As a result, the battery 42 supplies current to the motor 10 in a direction from its terminal 12 to its terminal 14 to produce the clockwise motor rotation. The driver transistor 60 maintains the bridge transistor 22 nonconductive during such time.

In the time interval defined by the letters C and D in FIG. 3, a logic 1 voltage potential is applied to both the input terminals 54 and 56. As indicated in the truth table of FIG. 4, a fourth state of motor operation results wherein the armature winding of motor 10 is de-energized (OFF) and the motor is dynamically braked. In such state, all of the driver transistors 58, 60, 70 and 72 are biased conductive. The driver transistors 58 and 70 bias the bridge transistors 18 and 20 conductive, and the driver transistors 60 and 72 divert the base drive current for the bridge transistors 22 and 24 to maintain such transistors nonconductive. As a result, the windings of motor 10 are short-circuited through one of the conductive bridge transistors 18 or 20 and one of the freewheeling diodes 34 and 36. If the motor 10 had been energized with current in a direction from its terminal 12 to its terminal 14 to effect clockwise motor rotation prior to the initiation of the dynamic braking, the short circuit current path would include the freewheeling diode 36 and the emitter-collector of bridge transistor 18. If the windings of motor 10 had been energized with current from battery 42 in a direction from the terminal 14 to the terminal 12 to effect counterclockwise motor rotation prior to the dynamic braking, the short circuit current path would include the freewheeling diode 34 and the emitter-collector circuit of the bridge transistor 20. In either case, the armature winding of motor 10 would be effectively short-circuited and dynamic braking would result.

Figure 2:
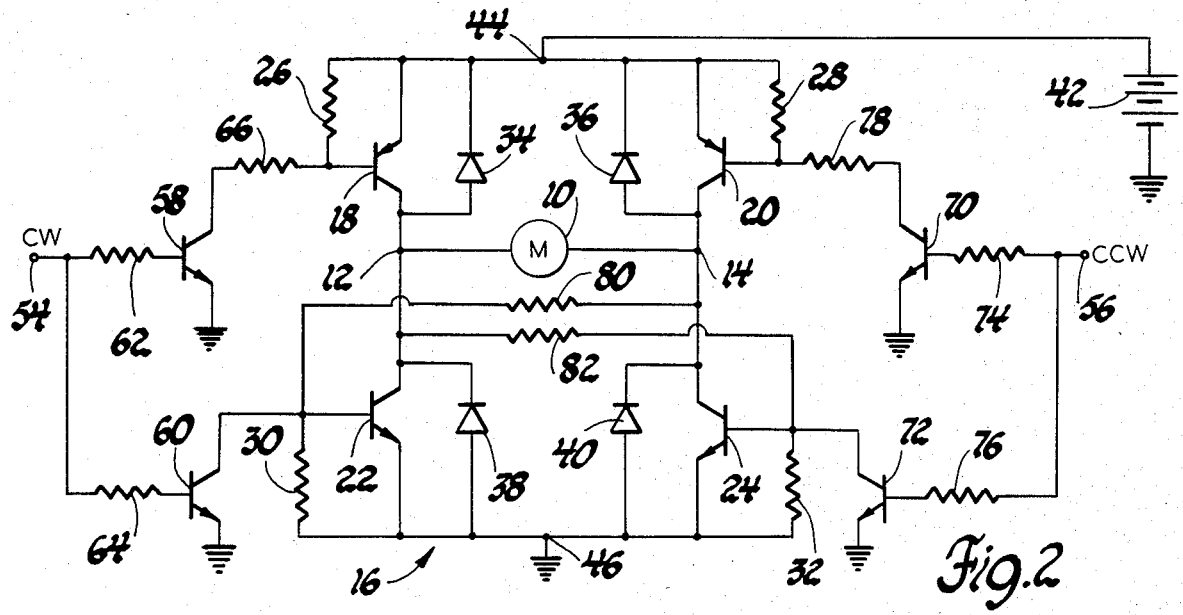
FIG. 2 is a circuit diagram of a bridge and driver circuit according to a second embodiment of this invention.

The drive circuit acccording to the second embodiment of this invention and depicted in FIG. 2 operates essentially the same as that depicted in FIG. 1. Corresponding circuit elements in FIG. 2 have therefore been assigned the same reference numerals as used in FIG. 1. The difference between the two embodiments relates to the means by which the diagonally opposed bridge transistors 18 and 24 or 20 and 22 are biased conductive. In the second embodiment depicted in FIG. 2, the driver transistors 58 and 70 supply drive current directly to only one of the diagonally opposed bridge transistors. Thus, the driver transistor 58 supplies drive current to the bridge transistor 18 through resistor 66 and the driver transistor 70 supplies drive current to the bridge transistor 20 through the resistor 78. The diagonally opposed bridge transistor 22 or 24 is biased conductive through the resistors 80 or 82, respectively. Thus, when the driver transistor 58 is biased conductive to bias the bridge transistor 18 conductive, the bridge transistor 24 is biased conductive through the resistor 82. Similarly, when the driver transistor 70 is biased conductive to bias the bridge transistor 20 conductive, the bridge transistor 22 is biased conductive through the resistor 80. The logic diagram of FIG. 3 and the truth table of FIG. 4 are equally applicable to the second embodiment drive circuit of FIG. 2 as the first embodiment drive circuit of FIG. 1, and are therefore not described in detail with respect to the second embodiment of FIG. 2.

Of the two embodiments, the embodiment depicted in FIG. 1 is preferred due to lower part count and increased efficiency. Nevertheless, both the drive circuits of FIG. 1 and FIG. 2 possess the same primary advantage—both are capable of providing four state motor control with only two control wires. Although circuitry for generating the logic zero and logic 1 voltage potential inputs for input terminals 54 and 56 is not shown herein, it will be obvious that any number of input circuits including a pair of switches connecting the input terminal to the positive and negative terminals of battery 42 or a microcomputer output port may be used.

As indicated above in reference to FIG. 1, dynamic braking for a given direction of motor rotation may be achieved by biasing an upper bridge transistor 18, 20 conductive, or by biasing a lower bridge transistor 22, 24 conductive. The bridge driver circuits illustrated in FIGS. 1 and 2 herein both effect dynamic braking by concurrently biasing the upper bridge transistors 18 and 20 conductive and the lower bridge transistors 22 and 24 nonconductive. It will be understood, however, that this invention also encompasses bridge driver circuits which effect dynamic braking by concurrently biasing the upper bridge transistors 18 and 20 nonconductive and the lower bridge transistors 22 and 24 conductive. To mechanize such an alternative bridge driver circuit, the driver transistor 60 would be connected to the base of bridge transistor 20 so as to maintain the bridge transistor 20 nonconductive when a logic one voltage potential is applied to input terminal 54 of the driver circuit 50. Similarly, the driver transistor 72 would be connected to the base terminal of bridge transistor 18 so as to maintain bridge transistor 18 nonconductive when a logic one voltage potential is applied to input terminal 56 of driver circuit 52. As with the illustrated embodiments, dynamic braking would be effected by applying a logic 1 voltage potential to both input terminals 54 and 56.

In view of the above, it will be understood that while this invention has been described in reference to two illustrated embodiments, various modifications thereto will occur to those skilled in the art and that driver circuits employing such modifications may fall within the scope of this invention which is defined by the appended claims.

The embodiments of the invention in which an exclusive property or privilege is claimed are defined as follows:

1. A drive circuit for controlling the conduction of an H-switch transistor bridge for connecting the positive and negative terminals of a DC source with the winding terminals of a DC motor in accordance with the voltage potential applied to a first and a second control terminals wherein the H-switch includes a first pair and a second pair of bridge transistors, each such pair comprising a PNP bridge transistor connecting one motor terminal to the positive terminal of said DC source and an NPN bridge transistor connecting the other motor terminal to the negative terminal of said DC source, the driver circuit comprising:

first and second pairs of NPN driver transistors connected to and controlled by said first and second control terminals respectively, one driver transistor of each such pair of driver transistors being connected to control the mutual conduction of one of said first and second pairs of brige transistors and the other driver transistor of each such pair of driver transistors being connected to hold the NPN bridge transistor of the other of said first and second pairs of bridge transistors in a nonconductive state when the one pair of bridge transistors are conductive, the first and second pairs of NPN driver transistors thereby being effective (1) when a voltage potential substantially corresponding to that at the negative terminal of said DC source is applied to both of said control terminals to render both bridge transistors of said first and second pairs of bridge transistors nonconductive to effectively disconnect the motor from the source, (2) when a voltage substantially corresponding to that at the negative terminal of said DC source is applied to one of said control terminals and a voltage determined in relation to that at the positive terminal of said DC source is applied to the other of said control terminals to effect clockwise or counterclockwise motor rotation, and (3) when a voltage determined in relation to that at the positive terminal of said DC source is applied to both control inputs to render the NPN bridge transistor of each of said first and second pairs of bridge transistors nonconductive and to render the PNP bridge transistor of each of said first and second pairs of bridge transistors conductive to short-circuit the DC motor through a conductive PNP bridge transistor to effect dynamic braking.

* * * * *